US011981541B2

(12) United States Patent
Noveletsky et al.

(10) Patent No.: US 11,981,541 B2
(45) Date of Patent: May 14, 2024

(54) LIFTING DEVICE

(71) Applicant: P.I.P. Lift LLC, Greenland, NH (US)

(72) Inventors: Joshua Noveletsky, York, ME (US); Alexandra Noveletsky, York, ME (US)

(73) Assignee: P.I.P. Lift LLC, Greenland, NH (US)

( * ) Notice: Subject to any disclaimer, the term of this patent is extended or adjusted under 35 U.S.C. 154(b) by 128 days.

(21) Appl. No.: 17/943,346

(22) Filed: Sep. 13, 2022

(65) Prior Publication Data

US 2023/0083608 A1 Mar. 16, 2023

Related U.S. Application Data

(60) Provisional application No. 63/276,738, filed on Nov. 8, 2021, provisional application No. 63/244,351, filed on Sep. 15, 2021.

(51) Int. Cl.
*B66C 1/10* (2006.01)
*B66C 23/26* (2006.01)

(52) U.S. Cl.
CPC .................................... *B66C 1/105* (2013.01)

(58) Field of Classification Search
CPC ........... B66C 1/105; B66C 1/12; B66C 1/125; B66C 1/68; B66C 23/62; B66C 23/72; B66C 23/74
USPC .................................... 294/67.5, 67.21, 81.3
See application file for complete search history.

(56) References Cited

U.S. PATENT DOCUMENTS 3,314,711 A * 4/1967 Dietz ....................... B66C 1/125 294/81.4
3,762,755 A * 10/1973 Saether .................... B66C 1/105 294/67.21
4,431,223 A 2/1984 Miller
4,648,647 A * 3/1987 Patton ...................... B66C 1/105 294/67.1
5,240,298 A * 8/1993 Teaby ...................... B66C 1/107 294/67.5
5,609,260 A * 3/1997 Liao ......................... B66C 23/26 212/279
5,836,632 A * 11/1998 Pompa ...................... B66C 1/12 294/82.12

(Continued)

FOREIGN PATENT DOCUMENTS

CN 104555715 A 4/2015
WO 2007/139383 A1 12/2007
WO 2020/026222 A1 2/2020

*Primary Examiner* — Paul T Chin
(74) *Attorney, Agent, or Firm* — Pierce Atwood LLP

(57) ABSTRACT

An under the hook lifting device configured to lift an object is provided. The lifting device includes a boom having a first end and a second end, and a strap having a length extending downwardly from the first end of the boom, where the strap is configured to be secured to an object. A winch is positioned on the boom, where the winch is configured to adjust the length of the strap extending downwardly from the first end of the boom. The lifting device also includes a counterweight extending downwardly from the second end of the boom, and a trolley positioned at the second end of the boom, where the trolley is slidable along the boom. The counterweight is supported by and movable with the trolley, where the position of the trolley along the boom is movable to maintain a substantially horizontal position of the boom. Methods of lifting an object with a lifting device are also provided.

19 Claims, 12 Drawing Sheets

(56) References Cited

U.S. PATENT DOCUMENTS

| | | | | |
|---|---|---|---|---|
| 5,874,247 | A | 2/1999 | Greenwell et al. | |
| 6,578,892 | B2 | 6/2003 | Tsimmerman | |
| 7,891,718 | B2 | 2/2011 | Heinaman | |
| 8,979,148 | B1 * | 3/2015 | Hatton, II | B66C 13/40<br>294/67.5 |
| 10,934,727 | B2 * | 3/2021 | Snell | B66C 23/26 |
| 2009/0084747 | A1 * | 4/2009 | Heinaman | B66C 1/105<br>212/285 |
| 2020/0361753 | A1 * | 11/2020 | Herse | B66C 23/64 |
| 2021/0114848 | A1 | 4/2021 | Long et al. | |
| 2022/0058890 | A1 * | 2/2022 | Wiethorn | G06Q 10/20 |

* cited by examiner

LIFTING DEVICE

RELATED APPLICATIONS

The present application claims the benefit under 35 U.S.C. § 119(e) to U.S. Provisional Application No. 63/244,351 filed on Sep. 15, 2021, and also claims the benefit under 35 U.S.C. § 119(e) to U.S. Provisional Application No. 63/276,738 filed on Nov. 8, 2021 the contents of both applications are incorporated by reference herein in its entirety.

FIELD OF THE INVENTION

This disclosure relates to an under the hook lifting device configured to lift an object.

BACKGROUND

An "under the hook lifting device" (also known as a "below the hook" lifting device) is an industry term used to describe a device that can be coupled to a crane, gantry, forklift, or other hoisting device. An under the hook lifting device is a term used to describe a device that is configured to be attached to the hook of a crane. In general, an under the hook lifting device is not configured to affect the cable of a crane, and it should be appreciated that an under the hook lifting device should only be used with a crane that has sufficient lifting capacity.

SUMMARY

According to one aspect, an under the hook lifting device configured to lift an object is provided. The lifting device includes a boom having a first end and a second end, and a strap having a length extending downwardly from the first end of the boom, where the strap is configured to be secured to an object to be lifted by the lifting device. The lifting device also includes a winch positioned on the boom, where the winch is configured to adjust the length of the strap extending downwardly from the first end of the boom. The lifting device further includes a counterweight extending downwardly from the second end of the boom, and a trolley positioned at the second end of the boom, where the trolley is slidable along the boom. The counterweight is supported by and movable with the trolley, where the position of the trolley along the boom is movable to maintain a substantially horizontal position of the boom.

According to another aspect, a method of lifting an object is provided. The method includes providing an under the hook lifting device, where the lifting device includes a boom having a first end and a second end, a strap having a length extending downwardly from the first end of the boom, a counterweight extending downwardly from the second end of the boom, and a trolley positioned at the second end of the boom. The method also includes securing the object to the strap at the first end of the boom, adjusting the length of the strap with a winch positioned on the boom, and sliding the trolley along the boom, where the counterweight is supported by and movable with the trolley, such that movement of the trolley moves the counterweight.

DETAILED DESCRIPTION

Figure 1:
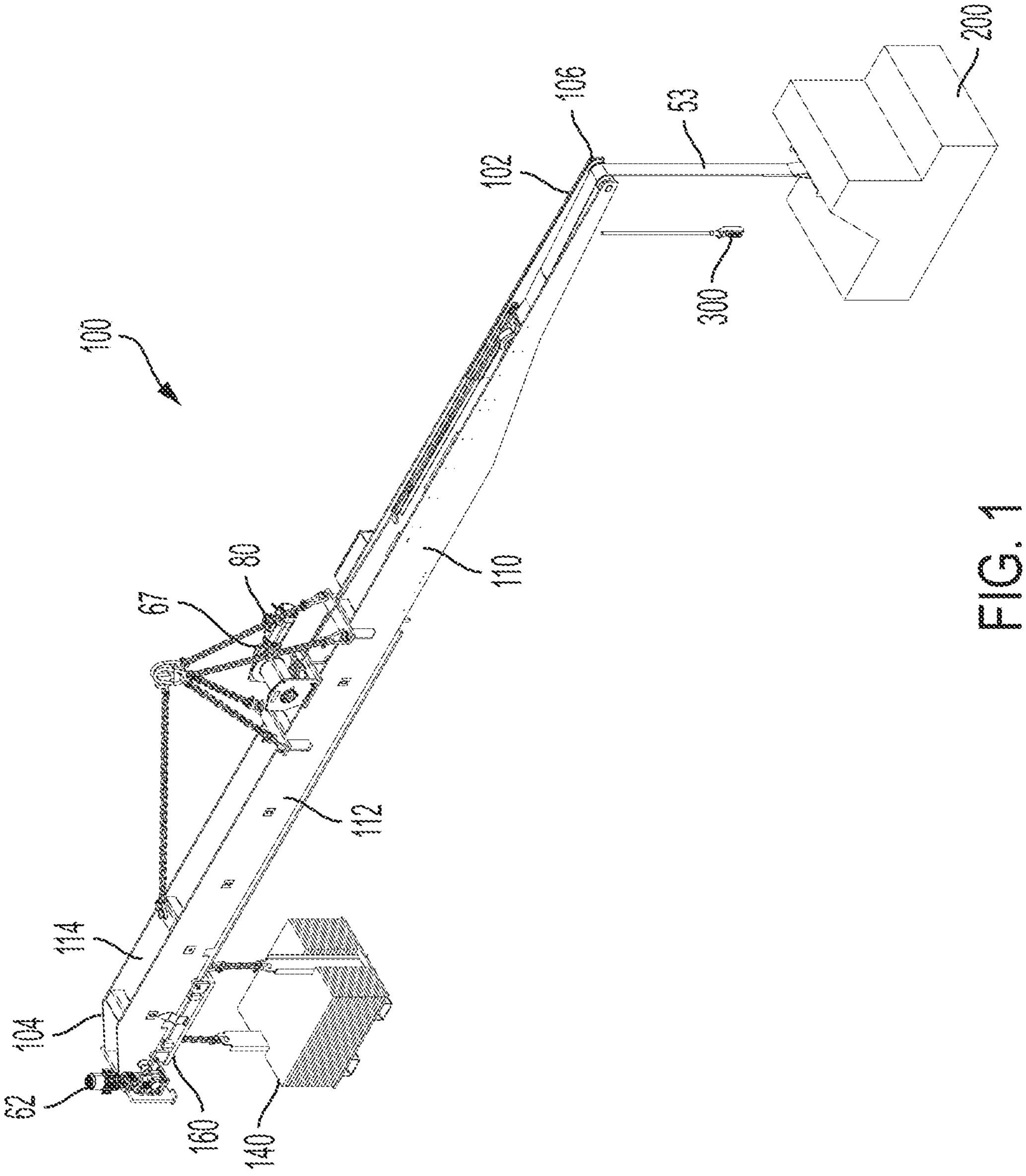
FIG. 1 is a perspective view of a lifting device according to one embodiment.

The present disclosure is directed to a lifting device. As set forth in more detail below, Applicant developed a unique under the hook lifting device that may be used, for example, in the installation and removal of various components of a boat/vessel, such as, but not limited to motors, transmissions, generators, stabilizers, etc. The present disclosure also contemplates a lifting device for lifting other objects, such as, but not limited to heavy objects such as appliances, furniture, pianos, etc. within other environments.

As set forth in more detail below, Applicant recognized a need for an under the hook lifting device that is easy to use, and/or easily adjustable based upon the weight of the object being lifted. Applicant further recognized a need for an under the hook lifting device that is configured to more easily fit into a small and/or narrow enclosure, which may be particularly advantageous when lifting an object into and/or out of a boat.

Turning now to FIGS. 1-5, one embodiment of a lifting device 100 will now be described. As shown, the lifting device 100 has a boom 110 having a first end 102 and a second end 104. One of ordinary skill in the art will recognizes that a boom 110 may generally be defined as any elongated rigid beam. As set forth in more detail below, the boom 110 may be made of a plurality of components secured together, and in one embodiment, the boom 110 may be made of a plurality of elongated plates. However, it should be appreciated that in another embodiment, the boom 110 may be configured differently as the present disclosure is not so limited. As set forth below, the boom 110 is the main structure that functions as the body of the lifting device 100. In one illustrative embodiment, the boom 110 is the part that interconnects the below described chains, drives, winch gears and counterweight 140.

As shown in FIGS. 1-5, the lifting device 100 also includes a strap 53 having a length L which extends downwardly from the first end 102 of the boom 110. As shown, the strap 53 is configured to secure an object 200 to be lifted by the lifting device 100. One of ordinary skill in the art will appreciate that the strap 53 may generally be defined as a rope, cable, and/or chain or otherwise elongated flexible material. In one embodiment, the strap 53 has a flat configuration having a substantially rectangular cross-sectional shape, but in another embodiment, the strap may have other configurations, such as, but not limited to a braided configuration and/or a circular cross-sectional shape.

To adjust the length L of the strap 53 extending downwardly from the first end 102 of the boom 110, the lifting device 100 may also include a winch 67. One of ordinary skill in the art will recognize that a winch 67 may generally defined as a device that can adjust the length of a strap 53, and may generally include a rotating drum/spool that can turn by a crank, motor, or other power source to adjust the length L of the strap 53.

To balance the weight of the object 200 to be lifted, the lifting device 100 also includes a counterweight 140. As shown in FIGS. 1-5, the counterweight is positioned on and extends downwardly from the second end 104 of the boom 110. A trolley 160 is also positioned at the second end of the boom 110, and as shown, the trolley 160 is slidable along the boom 110. As set forth in more detail below, the counterweight 140 is supported by and movable with the trolley 160, and the position of the trolley 160 along the length of the boom 110 is movable to maintain the substantially horizontal position of the boom 110. Details regarding the counterweight 140 and trolley 160 are discussed below. However, one of ordinary skill in the art will appreciate that the trolley 160 (i.e. carriage) may slide along the boom 110 in a variety of configurations, as the present disclosure is not so limited. As set forth in more detail below, in one embodiment, the trolley 160 is mounted to the boom 110 and supports the counterweight 140, it also may move fore and aft on wheels, and it may move via chains attached to a worm gear.

In one illustrative embodiment, the trolley 160 is configured to move from the second end 104 of the boom 110 to a center section of the boom. Applicant recognized that it was desirable to maintain a substantially horizontal position of the boom 110. One can appreciate that in general, for lifting a heavier object, the counterweight 140 and trolley 160 should be positioned closer to the second end 104 of the boom 110 to maintain the substantially horizontal position of the boom 110. Alternatively, for lifting a lighter object, the counterweight 140 and trolley 160 should be positioned closer to the center section of the boom 110 to maintain the substantially horizontal position of the boom 110. As set forth in more detail below, in one embodiment, the lifting device 100 may be calibrated to include a plurality of pre-marked locations along the length of the boom 110 so that the operator knows where to position the trolley 160 and counterweight 140 along the length of the boom 110 based upon the weight of the object 200 to be lifted. In one embodiment, the lifting device 100 is configured to lift an object 200 which has a weight ranging from approximately 0 lbs. to approximately 10,000 lbs.

Figure 3:
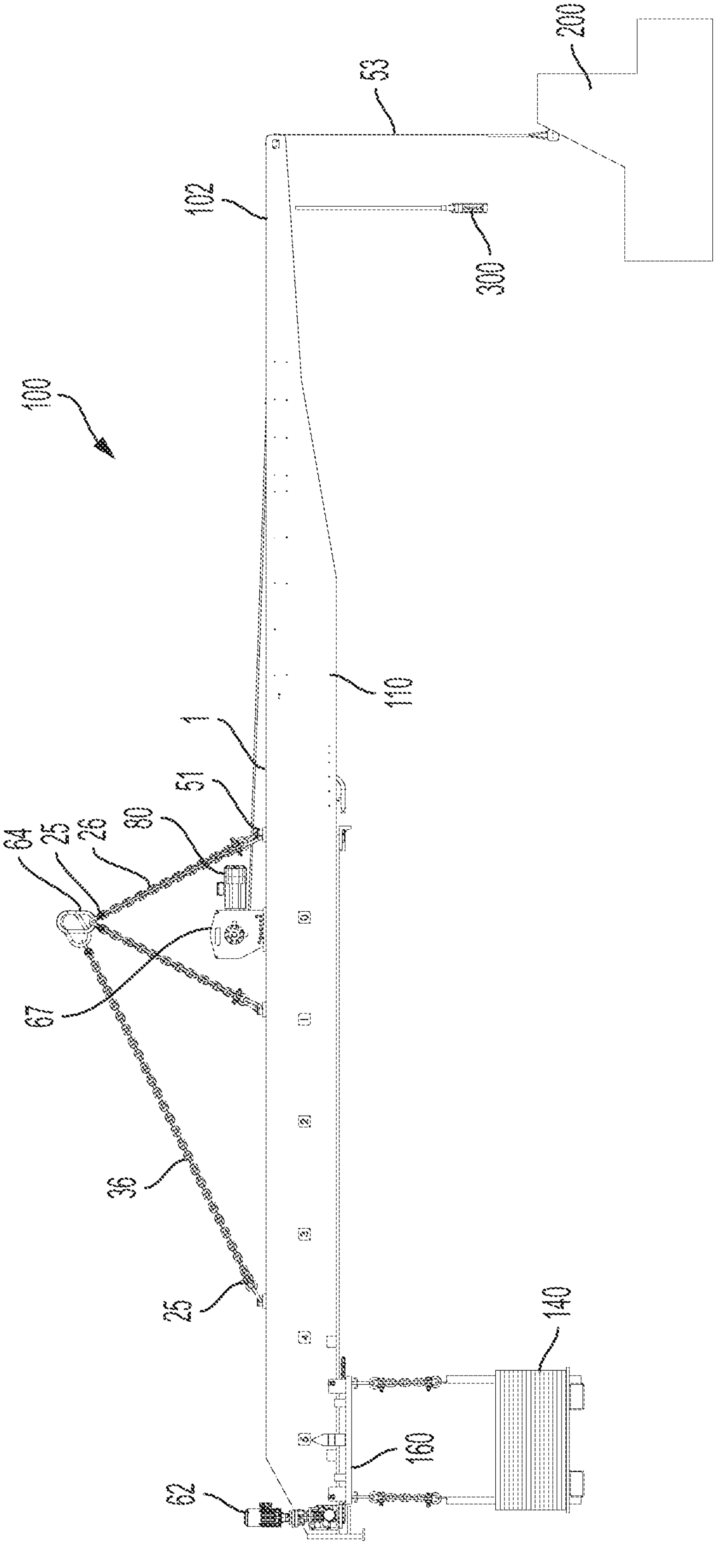
FIG. 3 is a front view of the lifting device shown in FIG. 1.
Figure 4:
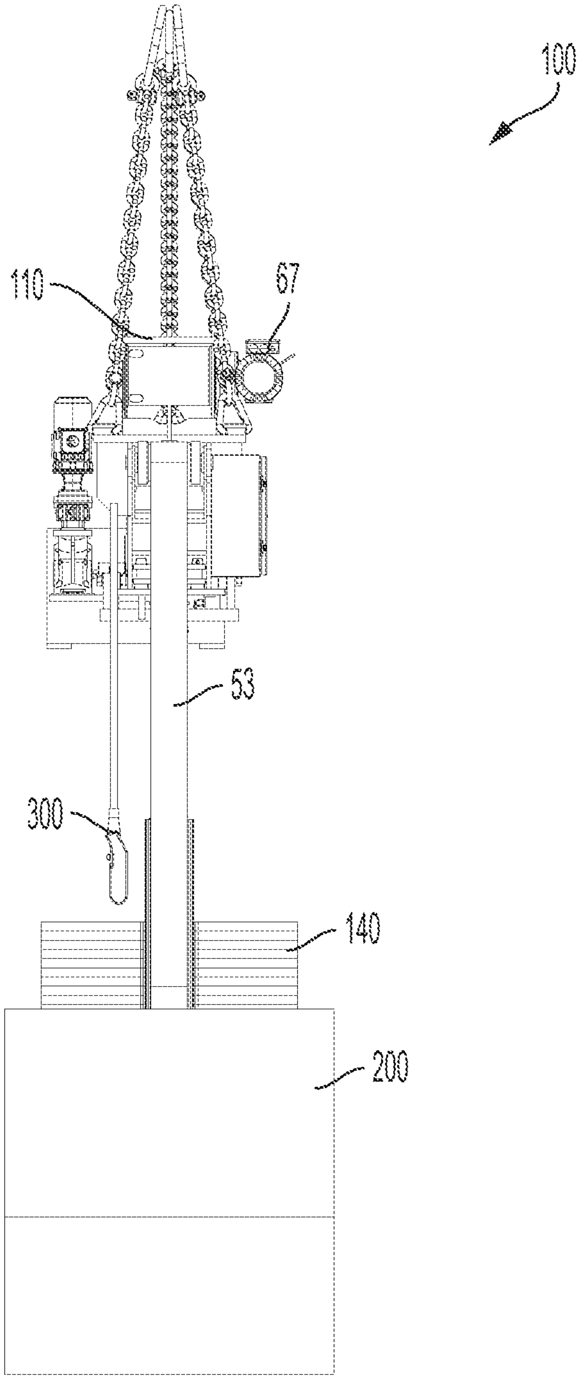
FIG. 4 is a side view of the lifting device shown in FIG. 1.
Figure 5:
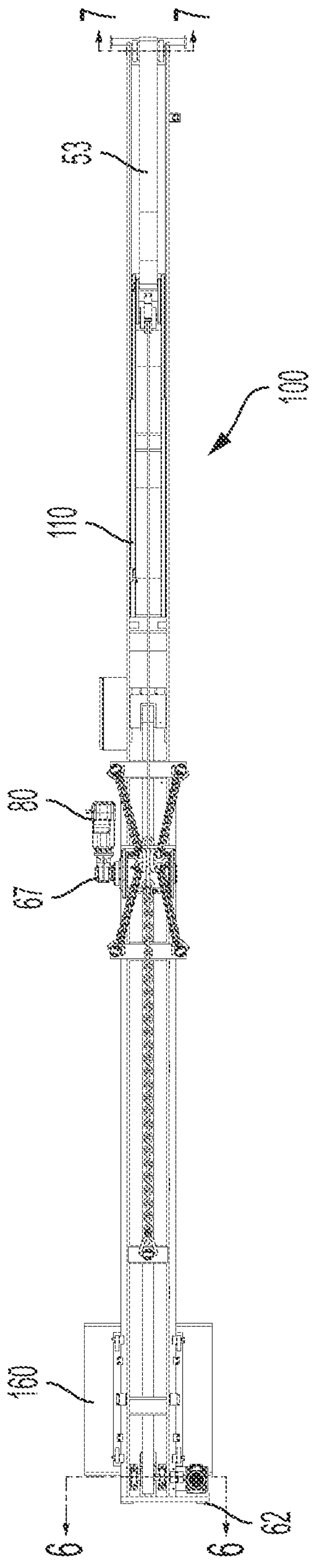
FIG. 5 is a top view of the lifting device shown in FIG. 1 illustrating the location of the cross-sectional views shown in FIGS. 6 and 7.

As shown in FIG. 3, the lifting device 100 includes a plurality of support lines 26, 36 coupled to the boom 110 which are configured to extend upwardly from the boom 110 to couple the lifting device 100 with a hooking point (not shown) of a device, such as crane, gantry, forklift, or other hoisting device. It should be appreciated that the support lines 26, 36 may include lifting chain, cable, rope or other suitable material to support the lifting device 100. In one illustrative embodiment, the plurality of support lines 26, 36 includes a plurality of support lines 26 positioned at the center section of the boom 110 as well as an additional support line 36 extending towards the second end 104 of the boom 110. In one embodiment, the upper end of the plurality of support lines 26, 36 all connect together with a master link 64 which can then be coupled to the hooking point of a crane or other hoisting device. It should be appreciated that the use of multiple chains between the hooking point and spaced apart locations along the boom 110, as illustrated, may help to ensure the stability of the boom 110.

As shown in FIG. 3, in one embodiment, one or more aspects of the lifting device 100 may be automated. For example, in one embodiment, a first motor 62 is coupled to the trolley 160, and the first motor 62 is configured to control movement of the trolley 160 and associated counterweight 140 along the boom 110. Further details of the trolley 160 and first motor 62 are shown in FIGS. 6 and 8-10, but in one embodiment, the first motor 62 is a worm gear motor positioned on the second end 104 of the boom 110. In one embodiment, a worm gear motor may be desirable as it includes a self-breaking feature since the output shaft is not able to rotate when there is no power applied.

Figure 2:
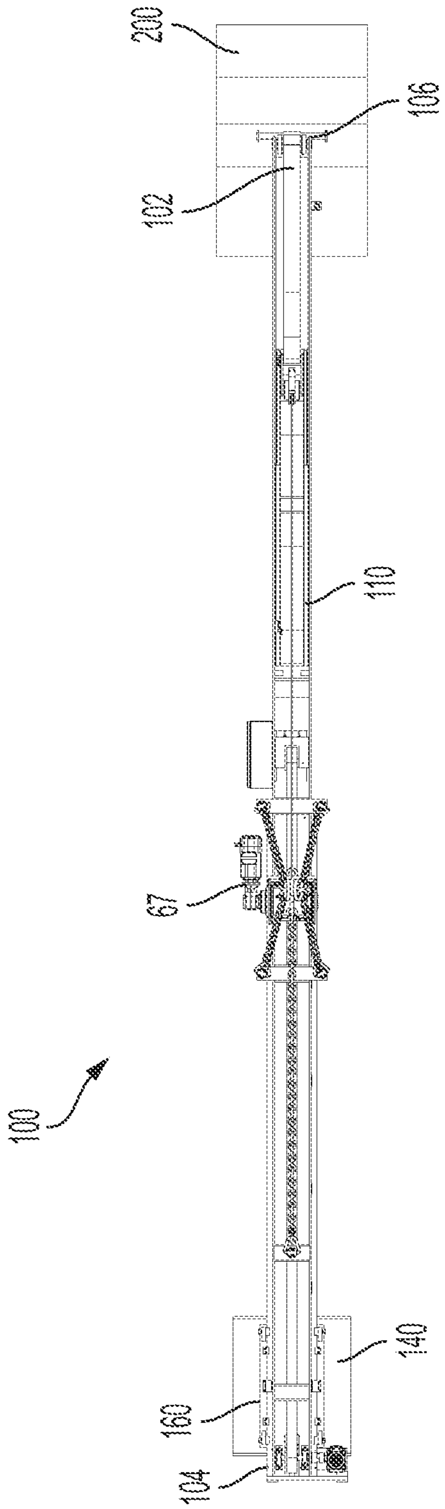
FIG. 2 is a top view of the lifting device shown in FIG. 1.

In one embodiment, the lifting device 100 further includes a second motor 80 coupled to the winch 67, wherein the second motor 80 is configured to adjust the length L of the strap 53. As shown in FIGS. 1-3, in one embodiment, the second motor 80 and the winch 67 are positioned in a center section of the boom 110, which may be approximately equidistant between the first end 102 and the second end 104 of the boom 110.

As shown in FIGS. 1-5, the lifting device 100 may further include a pendant 300 configured to control the first motor 62 and/or the second motor 80. In one embodiment, the pendant 300 is configured to control both the first motor 62 and the second motor 80. As shown, the pendant 300 may extend down from the first end 102 of the boom 110 so that an operator can easily control movement of the strap 53 and movement of the trolley 160 and counterweight 140 along the length of the boom 110. In one embodiment, the pendant has two buttons to control the up and down movement of the length L of the strap 53 to raise and lower the object 200, and two buttons to control the side to side movement of the trolley 160. A fifth button may be provided on the pendant 300 to power on and off the lifting device 100. In one embodiment, the lifting device 100 uses 220 volt, 3 phase power.

As shown in FIGS. 1-3, in one embodiment, the first end 102 of the boom 110 is tapered to permit the first end 102 of the lifting device 100 to access an enclosed space. As shown in FIG. 3, in one embodiment, the boom 110 is about 40 feet long and about 24 inches in height at the second end 104. As shown, the boom 110 may be tapered to about 7 inches at the first end 102 which enables the lifting device 100 to fit into smaller and/or tighter spaces.

In the embodiment illustrated in FIG. 1, the boom 110 includes a first plate 112 and a second plate 114, where the first and second plates 112, 114 each extend substantially from the first end 102 of the boom 110 to the second end 104 of the boom 110. In one embodiment, the second plate 114 is spaced apart from and substantially parallel to the first plate 112 forming an enclosure between the first and second plates 112, 114. As shown in FIGS. 1-2, the trolley 160 may be positioned within this enclosure formed between the first and second plates 112, 114. In one embodiment, each plate 112, 114 is approximately ¾ inch in thickness. The boom 110 may also include a bottom plate. This enclosure may provide a path for the trolley 160 and associated counterweight 140 to slide. The plurality of plates may also provide stability and prevent twisting under load. A plurality of tunes may also couple the first plate 112 to the second plate 114. These components may be welded or otherwise coupled together.

Figure 6:
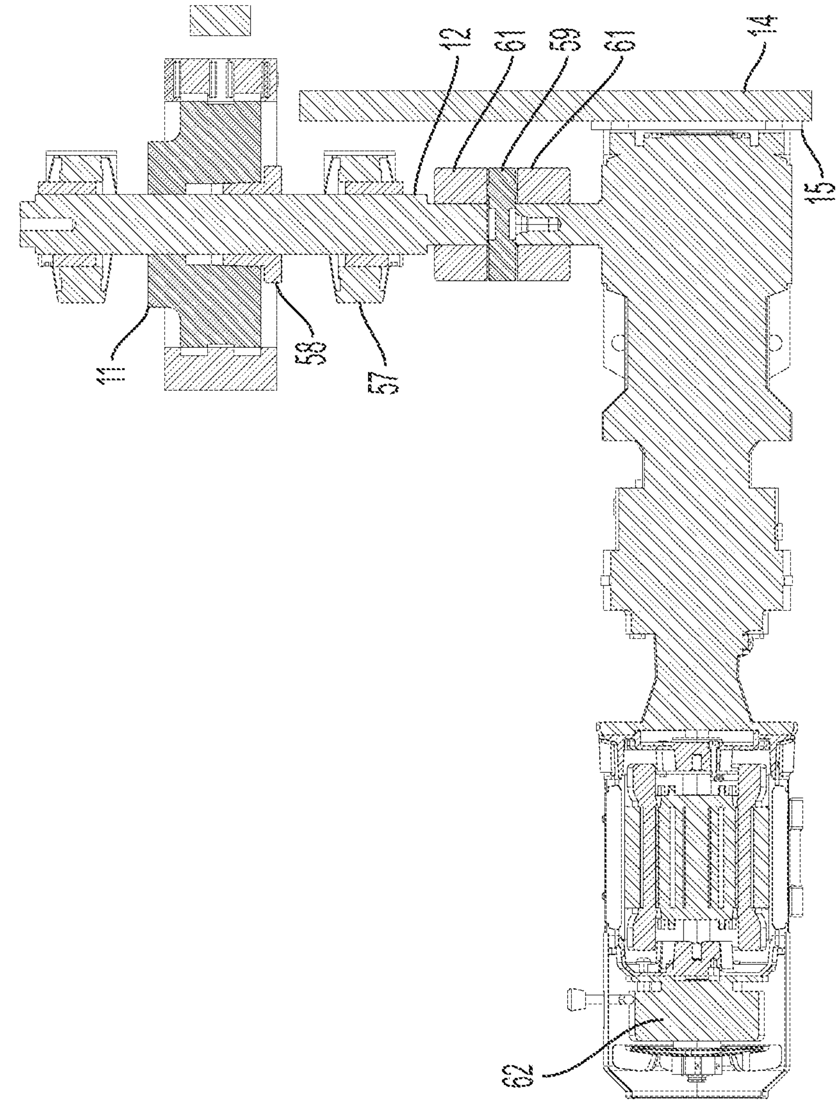
FIG. 6 is a cross-sectional view of one end of the lifting device illustrating one embodiment of the crane boom assembly.
Figure 7:
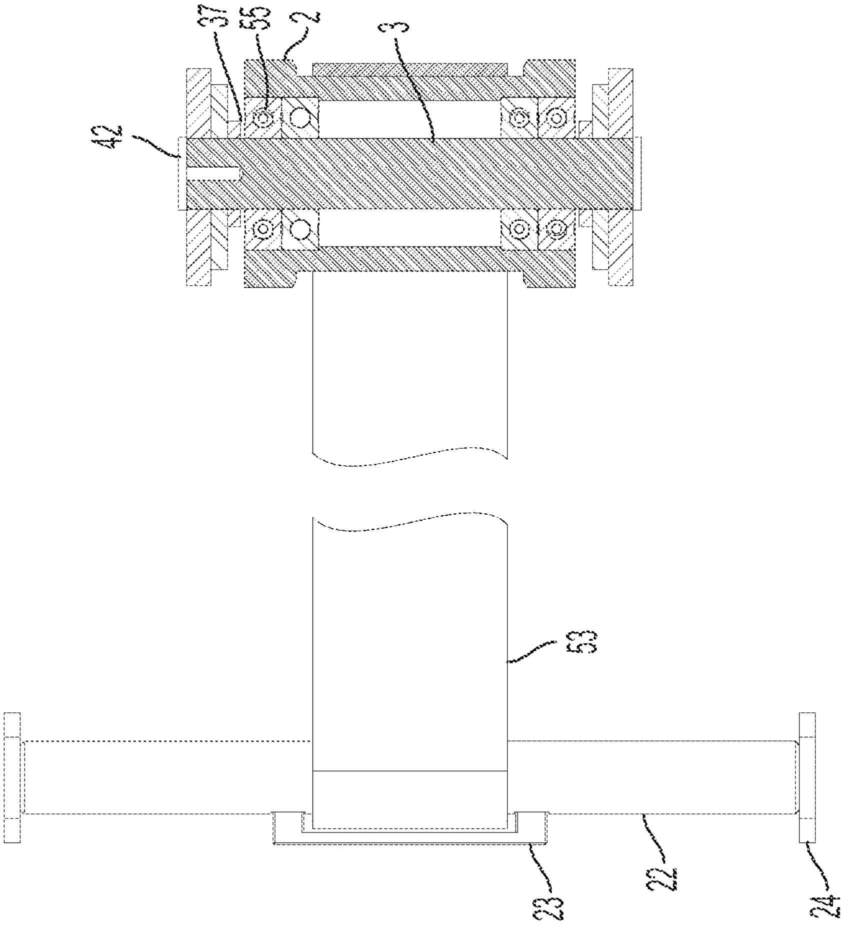
FIG. 7 is a cross-sectional view of the other end of the lifting device illustrating one embodiment of the crane boom assembly.

Turning now to FIGS. 6-7, two cross-sectional views of the lifting device 100 are shown in greater detail. In particular, FIG. 6 is a cross-sectional view of the second end 104 of the lifting device illustrating one embodiment of the crane boom assembly, and FIG. 7 is a cross-sectional view of the first end 102 of the lifting device. These figures illustrate additional components of the lifting device 100 according to one illustrative embodiment. For example, as shown in FIG. 6, the first motor 62 may be a worm gear motor which includes one or more of the following illustrated components: drive sprocket 11, draft shaft 12, gearbox mounting plate 14, gearbox spacer 15, ball bearings 57, bushing 58, coupling spider 59, and shaft coupling hub 61. Applicant recognized that the use of a worm gear motor allows for incremental adjustment when the lifting device 100 is used to lift different sized objects 200. It should be appreciated that a worm gear motor is an electric drive unit that may be controlled by the pendant 300. The function of the worm gear motor is to move the counterweight 140 to the appropriate location required to counter act the downward force of the object 200 being moved.

In one embodiment, the first end 102 of the boom 110 includes a roller 106 which may be designed to provide minimum friction and maximum stability of the strap 53 while moving. As shown in FIG. 1, in one embodiment, the roller 106 is positioned at the first end 102 of the boom 110 and is configured to provide a low friction contact point on the boom 110 for the strap 53. FIG. 7 illustrates that the first end 102 of the boom 110 may include one or more of the following components: strap pulley 2, strap pulley pin 3, spreader bar 22, strap holder 23, end strap 24, spacer bushing 37, shaft retainer 42, and ball bearings 55 to assist in the movement of the strap 53.

Figure 8:
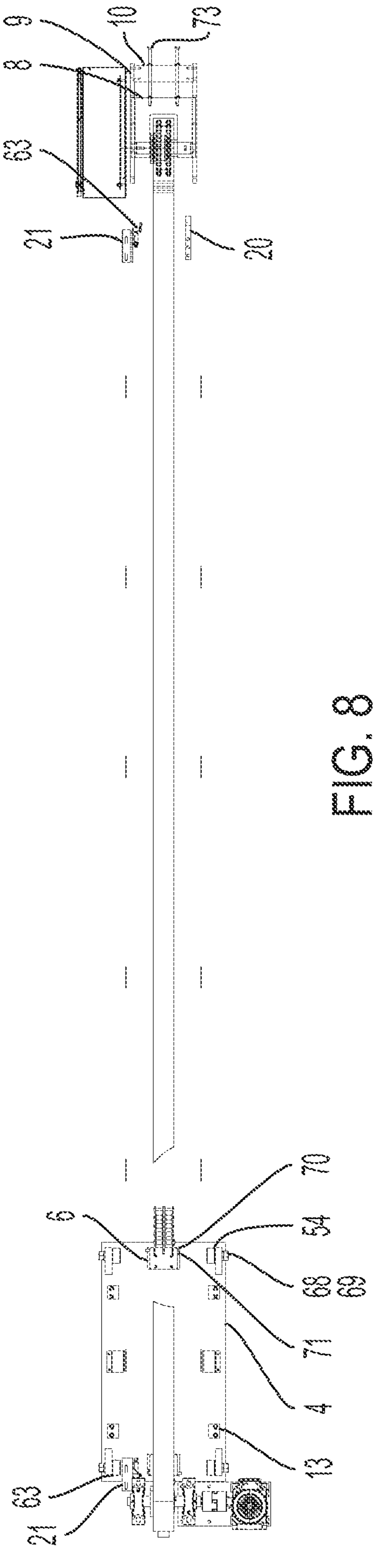
FIG. 8 is a top view of the counterweight shuffle according to one embodiment.
Figure 9:
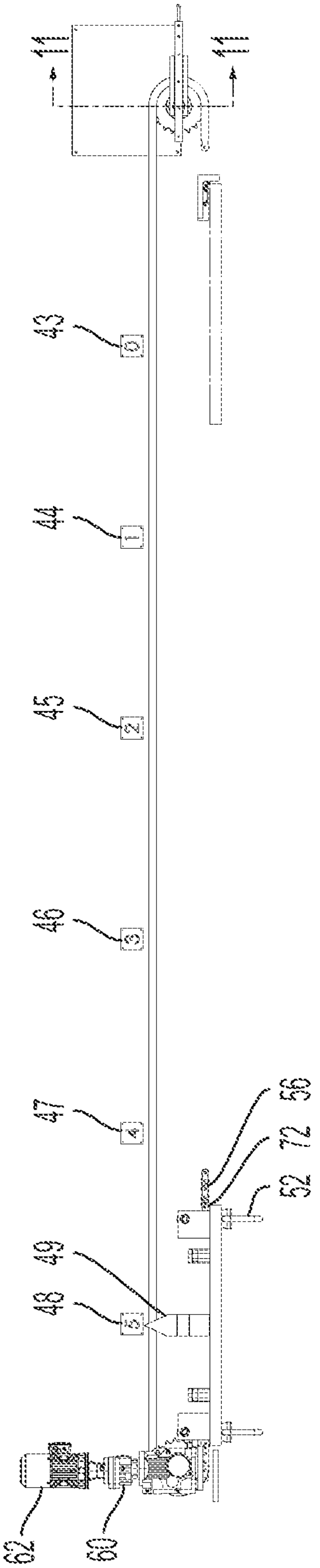
FIG. 9 is a front view of the counterweight shuffle shown in FIG. 8 illustrating the location of the cross-sectional view shown in FIG. 11.
Figure 11:
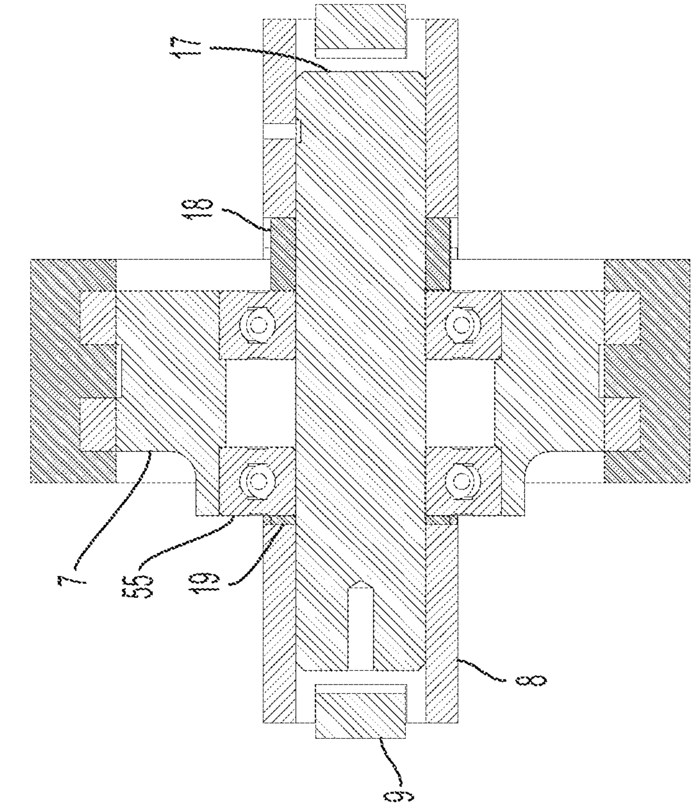
FIG. 11 is a cross-sectional view of the counterweight shuffle shown in FIG. 9.
Figure 10:
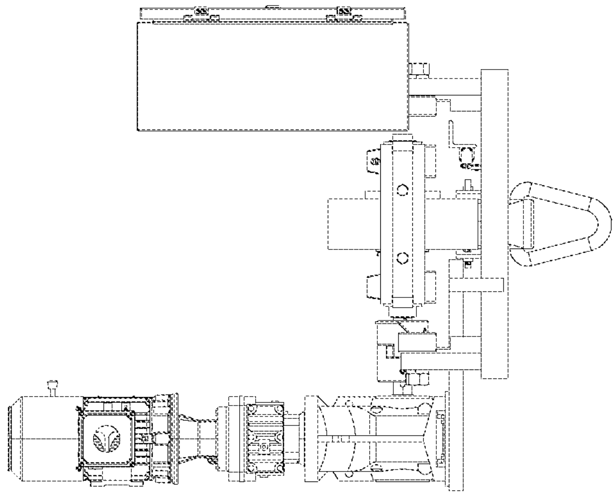
FIG. 10 is a side view of the counterweight shuffle shown in FIG. 8.

As mentioned above, the first motor 62 is configured to control movement of the trolley 160. Turning now to FIGS. 8-11, one embodiment of a trolley counterweight shuffle assembly will now be described. As shown in FIGS. 8-10, the first motor 62 may include a gear box 60. In particular, FIG. 8 is a top view of the trolley counterweight shuffle assembly, FIG. 9 is a front view, FIG. 10 is a side view, and FIG. 11 is a cross-sectional view. These figures illustrate additional components of the lifting device 100 according to one illustrative embodiment. For example, as shown in FIGS. 8-11, the trolley 160 may include one or more of the following components: a counterweight carriage 4, chain anchor 6, a carriage glide 13, tensioning block 8, tensioner glide 9, tensioner block 10, carriage stop 20, switch mount 21, limit switch roller arm 63, shoulder screw 71, track roller 54, ejector pin 70, hex nut 68, lock washer 69, roller chain 56, hoist ring 52, and connecting link for chain 72. As shown in the detailed cross-sectional view shown in FIG. 11, at the center of the boom 110, the trolley counterweight shuffle assembly may include one or more of the following components: tensioning block 8, tensioner glide 9, idler sprocket 7, idler shaft 17, and idler spacers 18, 19, and ball bearings 55.

As shown in FIG. 9, in one illustrative embodiment, the boom 110 includes a plurality of markings, or other indicia 43, 44, 45, 46, 47, 48 extending between the second end 104 of the boom 110 and the center section of the boom 110. Furthermore, as illustrated, the trolley 160 may include a pointer 49 to define incremental locations for the trolley 160 and associated counterweight 140 along the length of the boom 110. In one embodiment, the length of the boom 110 is about 40 feet, and the trolley 160 is configured to move about 20 feet along the length of the boom 110.

Figure 12:
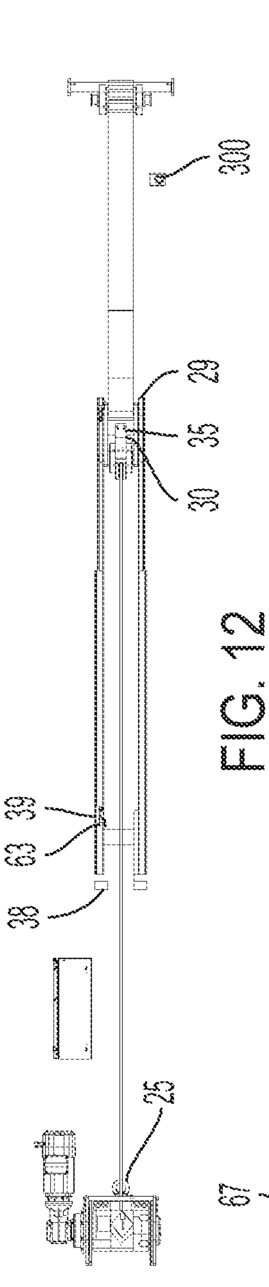
FIG. 12 is a top view of a crane boom assembly according to one embodiment.
Figure 13:
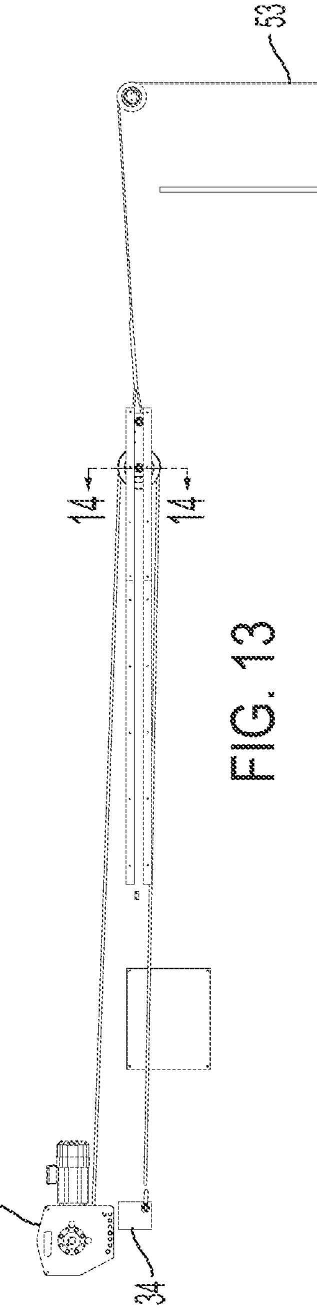
FIG. 13 is a front view of the crane boom assembly shown in FIG. 12 illustrating the location of the cross-sectional view shown in FIG. 14.
Figure 14:
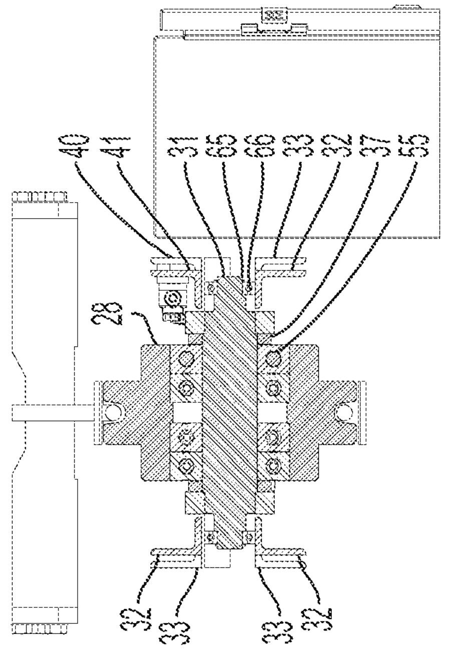
FIG. 14 is a cross-sectional view illustrating one embodiment of the crane boom assembly.

Turning now to FIGS. 12-14, further details regarding the crane boom assembly according to one embodiment will now be described. FIG. 12 is a top view, FIG. 13 is a front view, and FIG. 14 is a cross-sectional view illustrating one embodiment of the boom 110. As shown, the winch 67 is positioned on the boom 110 and is configured to adjust the length L of the strap 53 extending downwardly from the first end 102 of the boom 110. FIGS. 12-13 illustrate additional components of the lifting device 100 according to one embodiment. As shown, the lifting device 100 may include one or more of the following components: anchor block 34, stop block 38, limit switch roller arm 63, switch spacer 39, screw pin anchor shackle 25, shackle tie plate 30, rope guide 35, shackle side plate 29, shackle guides 32, 33, 40, 41, shackle pulley 28, shackle pin 31, retaining ring 65, ball bearings 55, 66, and spacer bushing 37. In one embodiment, components of the winch 67 (and in particular the portions shown in the cross-sectional view shown in FIG. 14) are spaced apart at least six feet away from the first end 102 of the lifting device 100 to allow for large motors to be held and maintain clearance when removing or installing an object 200.

Figure 16:
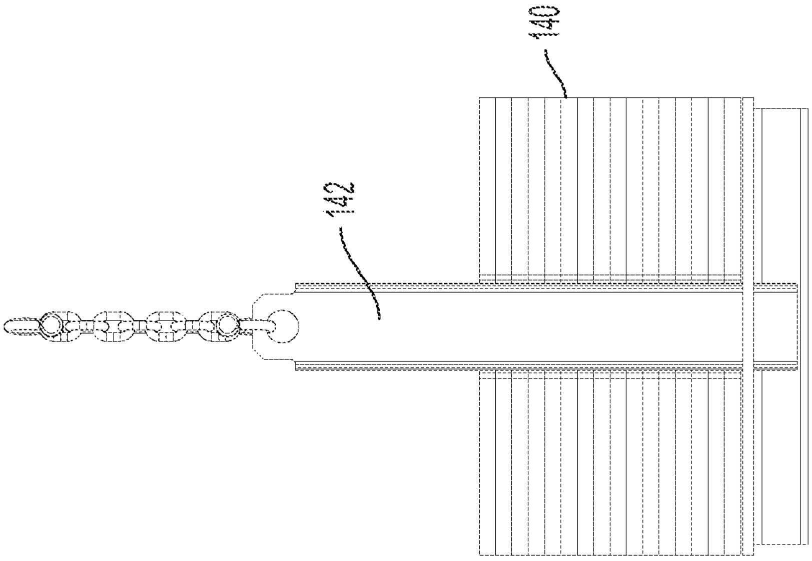
FIG. 16 is another view of the counterweight assembly shown in FIG. 15.
Figure 15:
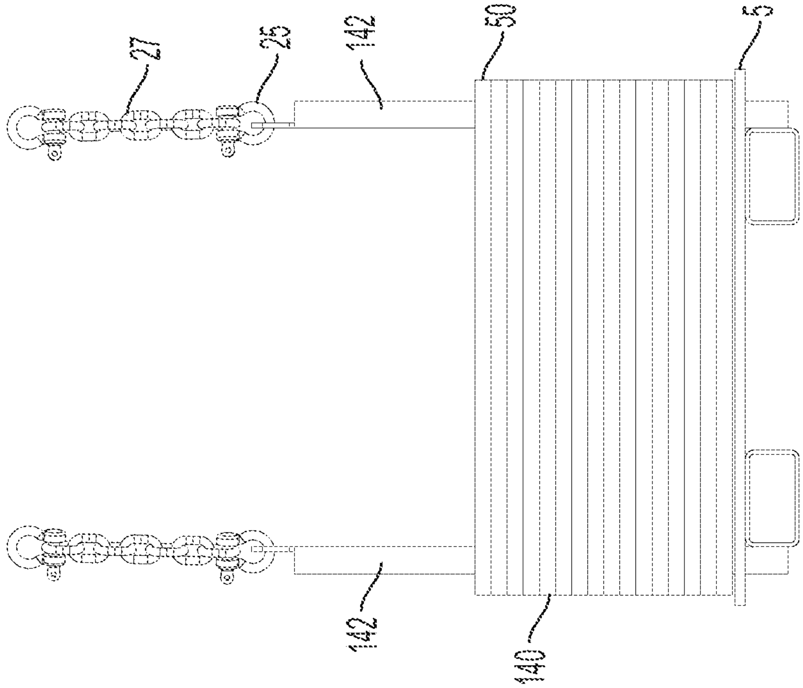
FIG. 15 is a counterweight assembly according to one embodiment.
Figure 17:
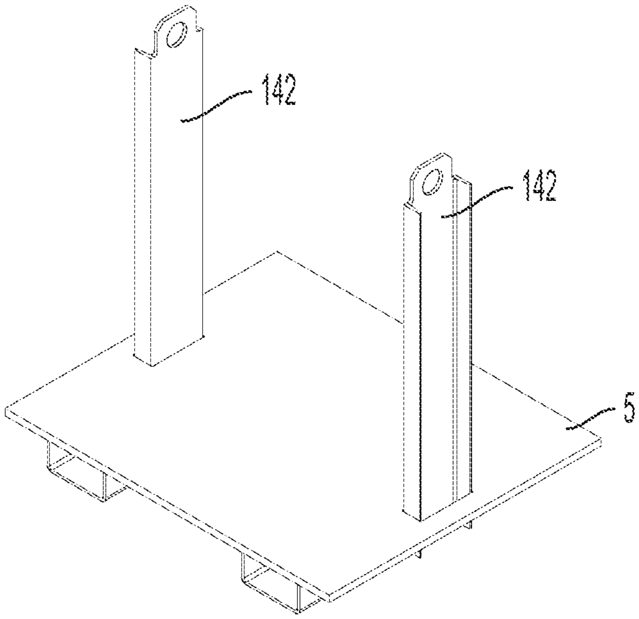
FIG. 17 is a counterweight base according to one embodiment.

FIGS. 15 and 16 illustrate one embodiment of a counterweight assembly in greater detail. As shown, the counterweight assembly may include a counterweight base 5 and the counterweight 140 is supported on top of the base 5. As shown, in one embodiment, the counterweight 140 includes a plurality of steel plates 50. In one embodiment, the counterweight 140 is approximately 10,000 lbs. However, it should be appreciated that in another embodiment, the counterweight 140 may have a different weight and may be configured differently, such as, but not limited to a one-piece counterweight 140. It should be appreciated that the counterweight 140 is located in the rear of the lifting device 100 and is used to balance the load that is being lifted by the main boom 110. As shown in FIGS. 15 and 16, the counterweight assembly may further include a plurality of posts 142 extending upwardly from the base 5 and a lifting chain 27 may be coupled to the upper end of the posts 142 to couple the counterweight 140 to the trolley 160. In one embodiment, screw pin anchor shackles 25 are provided on each end of the lifting chain 27 to secure the lifting chain to the posts 142 and the trolley 160. FIG. 17 illustrates the counterweight assembly shown in FIGS. 15-16 without the counterweight 140. As shown, in one embodiment, the posts 142 may have a substantially C-shaped cross-sectional shape and may also include a hole to secure the lifting chain 27.

Figure 18:
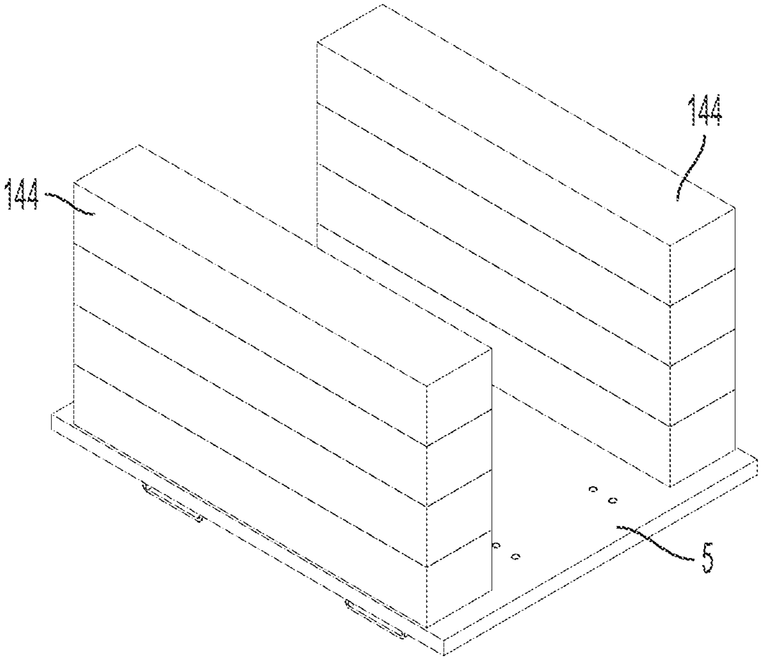
FIG. 18 is another embodiment of a counterweight base.

FIG. 18 illustrates another embodiment of a counterweight assembly which also includes a counterweight base 5. Instead of the posts 142, this particular assembly includes a wall 144 extending along opposing sides of the base 5. It should be appreciated that the counterweight assembly is generally coupled to the trolley 160 as discussed above. For example, in one embodiment, the walls 144 may be coupled to the trolley 160 so that the counterweight assembly is supported by and movable with the trolley 160. As shown in FIG. 18, in one embodiment, the walls 144 may be made of a plurality of blocks which may also form the counterweight 140.

The present disclosure also contemplates methods of lifting an object. In one embodiment, the method includes providing an under the hook lifting device 100, where the lifting device 100 includes a boom 110 having a first end 102 and a second end 104, and a strap 53 having a length L extending downwardly from the first end 102 of the boom 110. The lifting device 100 may further include a counterweight 140 extending downwardly from the second end 104 of the boom, and a trolley 160 positioned at the second end 104 of the boom 110. The method further includes securing the object 200 to the strap 53 at the first end 102 of the boom 110, and adjusting the length L of the strap 53 with a winch 67 positioned on the boom 110. The method also includes sliding the trolley 160 along the boom 110, where the counterweight 140 is supported by and movable with the trolley 160, such that movement of the trolley 160 moves the counterweight 140.

The method of lifting an object may also include attaching a plurality of support lines 26, 36 coupled to the boom 110 to a hooking point of a device such as a crane, a gantry or a forklift, such that the lifting device 100 extends downwardly from the hooking point. In one embodiment, the trolley 160 is slid along the boom 110 until the boom is in a substantially horizontal position. Furthermore, in one embodiment, the trolley 160 is movable along the boom 110 from the second end 104 of the boom 110 to a center section of the boom. It should be appreciated that a center section is approximately equidistant between the first end 102 and the second end 104 of the boom 110. Once the load is removed, the counterweight 140 may be brought back to a "0" location and the lifting device 100 is removed evenly. In one embodiment, the lifting device is controlled by a pendant control that functions to turn on/off power, move the counterweight and raise and/or lower the load/object 200. It should be appreciated that the trolley may slide (i.e. move) along the boom 110 in a variety of ways, as the disclosure is not so limited.

Although several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto; the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified, unless clearly indicated to the contrary.

All references, patents and patent applications and publications that are cited or referred to in this application are incorporated in their entirety herein by reference.

What is claimed is:

1. An under the hook lifting device configured to lift an object, the lifting device comprising:
- a boom having a first end and a second end;
- a strap having a length extending downwardly from the first end of the boom, wherein the strap is configured to be secured to an object to be lifted by the lifting device;
- a winch positioned on the boom, wherein the winch is configured to adjust the length of the strap extending downwardly from the first end of the boom;
- a counterweight extending downwardly from the second end of the boom; and
- a trolley positioned at the second end of the boom, the trolley slidable along the boom, wherein the counterweight is supported by and movable with the trolley, wherein the position of the trolley along the boom is movable to maintain a substantially horizontal position of the boom.

2. The lifting device of claim 1, further comprising a first motor coupled to the trolley, wherein the first motor is configured to control movement of the trolley.

3. The lifting device of claim 2, wherein the first motor is a worm gear motor positioned on the second end of the boom.

4. The lifting device of claim 2, further comprising a second motor coupled to the winch, wherein the second motor is configured to adjust the length of the strap.

5. The lifting device of claim 4, wherein the second motor and the winch are positioned in a center section of the boom.

6. The lifting device of claim 4, further comprising a pendant configured to control the first motor and the second motor.

7. The lifting device of claim 1, wherein the counterweight includes a plurality of plates.

8. The lifting device of claim 1, wherein the lifting device is configured to lift an object which has a weight ranging from approximately 0 lbs. to approximately 10,000 lbs.

9. The lifting device of claim 1, wherein the first end of the boom is tapered to permit the first end of the lifting device to access an enclosed space.

10. The lifting device of claim 1, wherein the boom includes a first plate and a second plate, wherein the first and second plates each extend substantially from the first end of the boom to the second end of the boom, wherein the second plate is spaced apart from and substantially parallel to the first plate, forming an enclosure between the first and second plates.

11. The lifting device of claim 10, wherein the trolley is positioned within the enclosure formed between the first and second plates.

12. The lifting device of claim 1, further comprising a plurality of support lines coupled to the boom and extending upwardly from the boom to couple the lifting device with a hooking point of a device such as a crane, a gantry or a forklift.

13. The lifting device of claim 1, further comprising a roller positioned at the first end of the boom, wherein the roller is configured to provide a low friction contact point on the boom for the strap.

14. The lifting device of claim 1, wherein the boom has a length, and the length is at least about 40 feet.

15. The lifting device of claim 1, wherein the trolley is configured to move from the second end of the boom to a center section of the boom.

16. A method of lifting an object, the method comprising:
providing an under the hook lifting device, wherein the lifting device comprises:
a boom having a first end and a second end;
a strap having a length extending downwardly from the first end of the boom;
a counterweight extending downwardly from the second end of the boom; and
a trolley positioned at the second end of the boom;
securing the object to the strap at the first end of the boom;
adjusting the length of the strap with a winch positioned on the boom; and
sliding the trolley along the boom, wherein the counterweight is supported by and movable with the trolley, such that movement of the trolley moves the counterweight.

17. The method of claim 16, further comprising:
attaching a plurality of support lines coupled to the boom to a hooking point of a device such as a crane, a gantry or a forklift, such that the lifting device extends downwardly from the hooking point.

18. The method of claim 16, wherein the trolley is slid along the boom until the boom is in a substantially horizontal position.

19. The method of claim 16, wherein the trolley is movable along the boom from the second end of the boom to a center section of the boom.

* * * * *